(12) United States Patent
Maehiro

(10) Patent No.: US 7,130,884 B2
(45) Date of Patent: Oct. 31, 2006

(54) CLIENT SYSTEM, MESSAGE EXCHANGING METHOD, AND RECORDING MEDIUM

(75) Inventor: Kazutoyo Maehiro, Tokyo (JP)

(73) Assignee: Kabushi Kaisha Square Enix (also Trading as Square Enix Co., Ltd.), Tokyo (JP)

( * ) Notice: Subject to any disclaimer, the term of this patent is extended or adjusted under 35 U.S.C. 154(b) by 822 days.

(21) Appl. No.: 09/821,279

(22) Filed: Mar. 29, 2001

(65) Prior Publication Data
US 2002/0062350 A1    May 23, 2002

(30) Foreign Application Priority Data
Nov. 17, 2000    (JP)    ............... 2000-351914

(51) Int. Cl.
G06F 15/16    (2006.01)
G06F 3/00     (2006.01)
G06F 9/00     (2006.01)
G06F 17/00    (2006.01)

(52) U.S. Cl. ........................ 709/206; 715/764

(58) Field of Classification Search ........ 709/202–207, 709/217, 219, 248; 715/758, 764, 761; 719/315–316; 463/29, 42–43
See application file for complete search history.

(56) References Cited

U.S. PATENT DOCUMENTS

| | | | |
|---|---|---|---|
| 5,689,641 A | 11/1997 | Ludwig et al. | 395/200.02 |
| 5,758,079 A | 5/1998 | Ludwig et al. | 395/200.34 |
| 5,802,294 A | 9/1998 | Ludwig et al. | 395/200.34 |
| 5,854,893 A | 12/1998 | Ludwig et al. | 395/200.34 |
| 5,867,654 A | 2/1999 | Ludwig et al. | 395/200.34 |
| 5,896,500 A | 4/1999 | Ludwig et al. | 395/200.34 |
| 5,915,091 A | 6/1999 | Ludwig et al. | 395/200.34 |
| 5,928,325 A * | 7/1999 | Shaughnessy et al. | 709/206 |
| 5,974,446 A * | 10/1999 | Sonnenreich et al. | 709/204 |
| 6,154,782 A * | 11/2000 | Kawaguchi et al. | 709/239 |
| 6,301,609 B1 * | 10/2001 | Aravamudan et al. | 709/207 |
| 6,459,776 B1 * | 10/2002 | Aktas et al. | 379/88.13 |
| 6,651,086 B1 * | 11/2003 | Manber et al. | 709/205 |
| 6,704,576 B1 * | 3/2004 | Brachman et al. | 455/503 |

FOREIGN PATENT DOCUMENTS

| | | |
|---|---|---|
| EP | 944003 | 9/1999 |
| WO | 00/69140 | 11/2000 |

OTHER PUBLICATIONS

U.S. Appl. No. 60/133,401, filed May 1999, Gudjonsson.*
http://web.archive.org/web/2001020505400/www.trillian.cc/compare.html.*
http://web.archive.org/web/20000229033701/http://messenger.msn.com.*
http://web.archive.org/web/20000510080357/http://messenger.msn.com.*

(Continued)

*Primary Examiner*—Bharat Barot
*Assistant Examiner*—Asad Muhammed Nawaz
(74) *Attorney, Agent, or Firm*—Greenblum & Bernstein, P.L.C.

(57) ABSTRACT

A message exchanging method enables simple interactions between two users during message exchanges and enables one-to-one interactions to shift to interactions between three or more users. Upon receiving a message from a third person while two users are exchanging messages using a messenger, a client machine requests a server to open a chat room. The client that connects to a chat room activates a chat application using the messenger to allow the users to engage in a chat.

20 Claims, 15 Drawing Sheets

OTHER PUBLICATIONS http://web.archive.org/web/20000808043455/http://www.aim.com/.*

Asakawa, S., "New Business Style Generated by Sametime," Lotus Notesmagazine, Japan, SOFTBANK Publishing Inc., No. 32, p. 45-56, Jun. 1999.

Yabu, A., "Q&A Answering the Question of ICQ," INTERNET magazine, Japan, Impress Corp., No. 39, p. 301, Apr. 1998.

"WinSIG96 World Wide Chat with NetMeeting!," ASCII, Japan, ASCII Corporation, vol. 20, No. 11, pp. 370-371, Nov. 1996.

Inoue, K., "Communication Tool Exceeding Chat PowWow," INTERNET Surfer, Japan, AI Publishing Inc., vol. 1 No. 11, p. 62-69, Apr. 1997.

"Go! With Instant Message," Internet magazine, Japan, Impress Corp., No. 58, p. 217, Nov. 1999.

"What is pager?," Internet ASCII, Japan, ASCII Corporation, vol. 5 No. 2, pp. 46-47, Feb. 2000.

Shibata, J., "Attain New Utility! The Third Let's Chat with Network," Nikkei Mac, Japan, Nikkei Business Inc., vol. 8, No. 5, p. 164-169, Apr. 2000.

* cited by examiner

Navigator

Welcome to maehiro(MasterAccount)    2000.1.29 sat.

Chat   Room no.001.   FF 11 THE FARTHEST FRONTIER   Master Account: maehiro

```
Takeshi > TAKESHI, HOW ABOUT A VISIT TO THE RUINS OF ASSAM?
          IT'S BLACK MAGIC NOW, RIGHT?)
Kazu    > HOW'S THE HUMIDITY LEVEL TODAY?
Squall  > ULTRA-WET.
Kazu    > FORGET IT, THEN. IT'LL PROBABLY ONLY END IN DISASTER.
          I'LL LEARN A FEW SPELLS INSTEAD.
Takeshi > WHAT, YOU'RE "FIRE"?
Kazu    > YEAH, COULDN'T BE WORSE!
Squall  > NO USE.
System  | MAEHIRO HAS ENTERED CHAMBER.
Natsumi > ME 2.
Takeshi > YOU'RE HERE?
          I THOUGHT YOU HAD CHIMI AND RYUKAKUSO.
Natsumi > I HAVE.
```

THE ANTIDOTE FOR MORM?
LET ME HAVE IT!

Send   Messege
Face   Option

Member   17/20

Master: Takeshi
    Natsumi
    Kazu
    Neil
    Squall
    Kid
    Selphie
    Cloud
    Zell
    Tifa Open Lv.1 For Friends New!!

Online    IN-LINE FOR MAHJONG    e-mail 1   message 1    LogOut

FIG.8

CLIENT SYSTEM, MESSAGE EXCHANGING METHOD, AND RECORDING MEDIUM

This present disclosure relates to subject matter contained in Japanese Patent Application No. 2000-351914, filed on Nov. 17, 2000, the disclosure of which is expressly incorporated herein by reference in its entirety.

BACKGROUND OF THE INVENTION

1. Field of the Invention

The present invention relates to a client system, a message exchanging method, and a recording medium and more specifically, to a client system, a message exchanging method, and a recording medium which allow a plurality of users to exchange messages on a network.

2. Description of the Related Art

Network communications tools are conventionally available which allow users of client machines connected to a network represented by the Internet to exchange messages in real time.

Some tools allow two users to exchange messages on the Internet in real time using a unicast function (one-to-one communication). For example, one-to-one message exchanging tools for a multiwindow environment such as the ICQ (a trade mark of Milabilis in Israel) enable two users to exchange messages by displaying different screens for transmitted and received messages on the client machines.

Additionally, some tools use a multicast function (communication within a particular group from one user to a plurality of users), which allows multiple users to exchange messages on the Internet in real time, that is, to enjoy chats. Chat tools display within one screen chat messages transmitted to a chat room opened by a server machine and saved therein according to time series.

If a user uses the tool allowing two users to exchange messages in the multiwindow environment, the user must switch screens for each transmission or reception; these operations are cumbersome.

In addition, when two users are exchanging messages in real time using the one-to-one message exchanging tool and if one of the users receives a message from a third person who is known to these two users, the three users may desire to enjoy a chat. In this case, the use of the one-to-one message exchanging tool is stopped, one of the users opens a new chat room using the above-mentioned chat tool, and the three users then enter the chat room opened using the chat tool. It is, however, cumbersome to use these different network communications tools. This problem must be solved.

SUMMARY OF THE INVENTION

It is thus an object of the present invention to provide a client system, a message exchanging method, and a recording medium which enable two users to interact with each other using simple operations and which enable one-to-one interactions to shift to interactions between three or more users using simple operations.

To attain this object, according to the present invention a client system is provided in a message exchanging system including client systems and at least one server system connected together via a communications network. The server system authenticates each user of the client systems and accumulates and distributes messages. The client systems exchange messages via the server system. The client system includes a first message exchanging system that enables one-to-one message exchanges with a first client system of the client systems. The client system includes a second message exchanging system that enables simultaneous message exchanges with one or more second client systems of the client systems, and a message exchange switching system. The message exchange switching system switches between the first message exchanging system and the second message exchanging system, if the client system receives a message from the second client system while the first message exchanging system is exchanging messages with the first client system, the message exchange switching system switches from the first message exchanging system to the second message exchanging system to enable message exchanges with the first and second client systems.

Additionally, the message exchange switching system sets in the server system an environment for allowing the second message exchanging system to exchange messages if the message exchange switching system switches from the first message exchanging system to the second message exchange switching system.

Further, the first message exchanging system displays exchanged transmitted and received messages in one display screen in the order of transmissions and receptions.

According to the present invention, there is provided a message exchanging method for a client system in a message exchanging system including client systems and at least one server system connected together via a communications network. The server system authenticates each user of the client systems and accumulates and distributes messages. The client systems exchange messages via the server system. The method includes a first message exchange that enables one-to-one message exchanges with a first of the client systems, & a second message exchange that enables simultaneous message exchanges with one or more second client systems of the client systems. The method also includes message exchange switching that switches between the first message exchange and the second message exchange. If a message is received from the second client system while the first message exchange is exchanging messages with the first client system, the message exchange switching switches from the first message exchange to the second message exchange to enable message exchanges with the first and second client systems.

According to the present invention, there is provided a message exchanging method for a message exchanging system including client systems and at least one server system connected together via a communications network. The server system authenticates each user of the client systems and accumulates and distributes messages. The client systems exchanging messages via the server system. The method includes a first message exchange that enables one-to-one message exchanges with another first client system of the client systems, and a second message exchange that enables simultaneous message exchanges with one or more other second client systems of the client systems. The method also includes message exchange switching that switches between the first message exchange and the second message exchange. If a message is received from the second client system while the first message exchange is exchanging messages with the first client system, the message exchange switching switches from the first message exchange to the second message exchange to enable message exchanges with the first and second client systems.

According to the present invention, there is provided a computer-readable recording medium for a client system in a message exchanging system. The recording medium has a message exchanging program recorded therein. The message exchanging system includes client systems and at least one server system connected together via a communications network. The server system authenticates each user of the client systems and accumulates and distributes messages. The client systems exchange messages via the server system. The program includes a first message exchange that enables one-to-one message exchanges with a first of the client systems, second message exchange that enables simultaneous message exchanges with one or more second client systems of the client systems. The method also includes message exchange switching that switches between the first message exchange and the second message exchange. If a message is received from the second client system while the first message exchange is exchanging messages with the first client system, the message exchange switching switches from the first message exchange to the second message exchange to enable message exchanges with the first and second client systems.

According to the present invention, there is provided a program product of a message exchanging method for a client system in a message exchanging system including client systems and at least one server system connected together via a communications network. The server system authenticates each user of the client systems and accumulates and distributes messages. The client systems exchange messages via the server system. The program product includes a first message exchange that enables one-to-one message exchanges with another first client system of the client systems. The program product also includes a second message exchange that enables simultaneous message exchanges with one or more second client systems of the client systems, and a message exchange switching that switches between the first message exchange and the second message exchange. If a message is received from the second client system while the first message exchange is exchanging messages with the first client system, the message exchange switching switches from the first message exchange to the second message exchange to enable message exchanges with the first and second client systems.

Additionally, the message exchange switching includes setting in the server system an environment for allowing the second message exchange to exchange messages if the message exchange switching switches from the first message exchange to the second message exchange.

Further, the first message exchange displays exchanged transmitted and received messages in one display screen in the order of transmissions and receptions.

According to the present invention, the client system in the message exchanging system can execute one-to-one message exchanges with a first of the client systems, and can execute simultaneous message exchanges with one or more other second client systems of the client systems. When the client system receives a message from the second client system while exchanging messages with the first client system, the client system can switch from the one-to-one message exchange with the first client system to the simultaneous message exchanges with the first and second client systems.

Additionally, according to the present invention, the environment for allowing the simultaneous message exchanging system to exchange messages is set in the server system if the one-to-one message exchange with the first client system is switched to the simultaneous message exchanges with the first and second client systems. Thus, one-to-one interactions can be switched to the interactions between three or more users using simple operations.

According to the present invention, the client system displays, for the one-to-one message exchanges with the first client system further, displays exchanged transmitted and received messages in one display screen in the order of transmissions and receptions.

Thus, the one-to-one interactions are possible with simple operations.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a view showing an example of a chat screen according to an embodiment of the present invention;

DETAILED DESCRIPTION OF PREFERRED EMBODIMENTS

Figure 1:
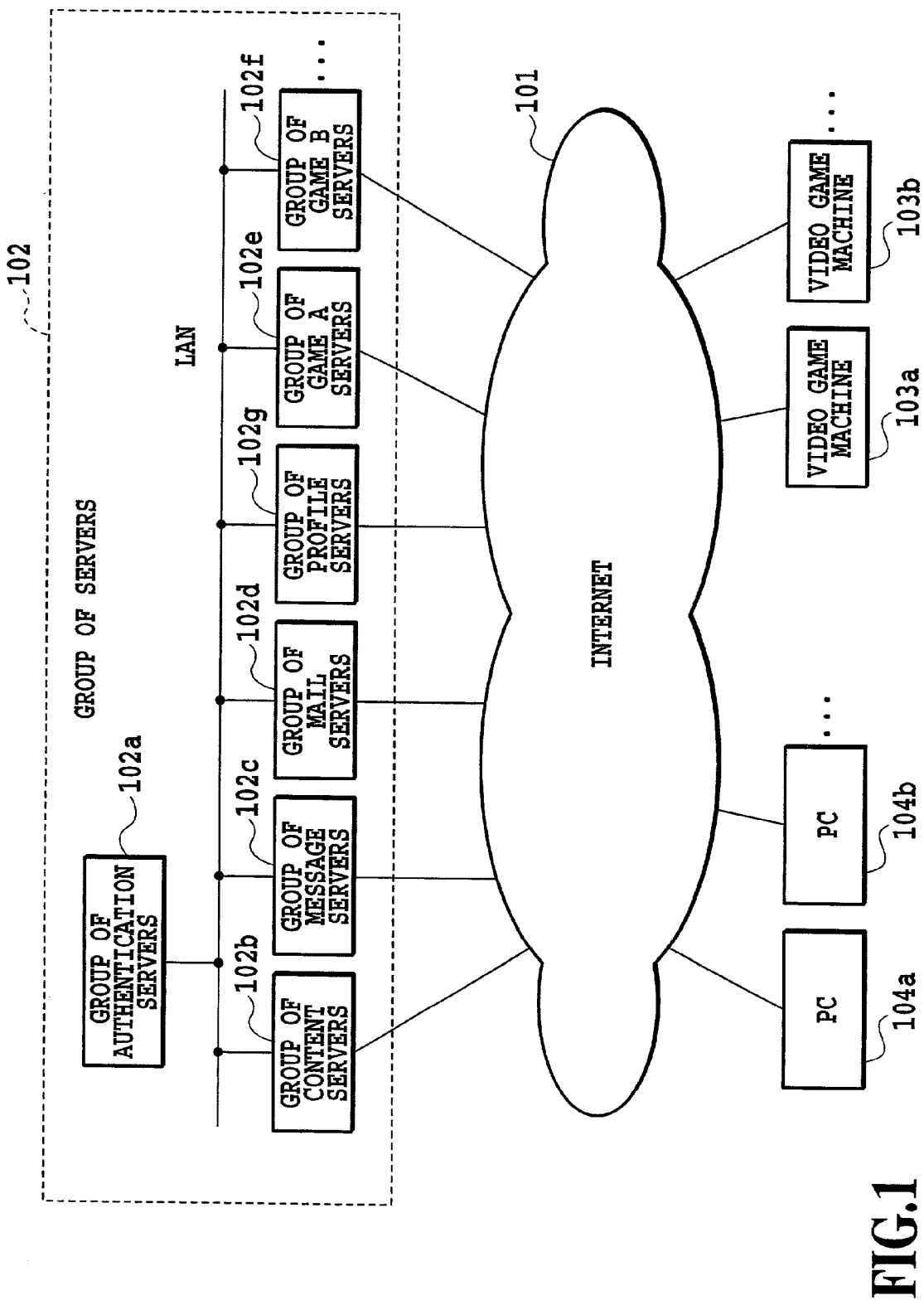
FIG. 1 is a block diagram of a system configuration of a network system according to an embodiment of the present invention.

An embodiment of the present invention will be described below in detail. In the drawings, parts having the same functions are denoted by the same reference numerals to eliminate duplicate explanation of the same parts.

A message exchange system according to the present embodiment will be explained as a function for a network service system provided by a network service company. The network service system according to the present embodiment provides network services for subscribed users via the Internet, the network services being provided by the network service company by installing and operating a group of servers.

The network services include, for example: a content viewing service that provides sports, music, comics, shopping, and various other information, a communications service that provides an environment for real-time message exchanges between users (this environment constitutes a message exchanging system according to the present embodiment) and a mail service environment, and game service that provides an online game environment activated via the network.

The subscribed users for the network services activate a viewer (data displaying software) dedicated for the network services, on a client machine, and access the group of servers of the network service company to receive the services.

(System Configuration)

FIG. 1 shows the system configuration of a network service system according to the present embodiment. In FIG. 1, the network service system includes a communications network 101, a group of servers 102 of a network service company, client systems 103a, 103b, 104a, 104b, and the like connected to the group of servers 102 via the communications network 101 and used by a group of users. The group of servers 102 and the client systems 103a, 103b, 104a, and 104b are each a computer system.

The client systems 103a and 103b are home video game machines. The client systems 104a and 104b are personal computers (hereafter referred to as "PCs"). The client systems 103a and 103b can load and activate the program of the above-mentioned viewer from a CDROM. The client systems 104a and 104b has the viewer loaded therein beforehand.

The communications network 101 has the group of servers 102 and the client systems 103a, 103b, 104a, 104b, and the like connected thereto. The communications network 101 is assumed to be the Internet according to the present embodiment. A typical protocol such as TCP/IP, HTTP (HyperText Transfer Protocol), SMTP (Simple Mail Transfer Protocol), or FTP (File Transfer Protocol) may be used to transmit and receive data.

In response to a request from each of the client systems, the group of servers 102 access and process retained data and provide services for the client system. The group of servers 102 have a group of authentication servers 102a, a group of content servers 102b, a group of message servers 102c, a group of mail servers 102d, a group of game A servers 102e, a group of game B servers 102f, and a group of profile servers 102g.

The group of authentication servers 102a includes authentication server systems. The authentication server systems each manage the account (user ID (identifier)) and password of each subscribed user. The authentication server systems may also manage connections of users (online/offline) and the addresses of the client machines of users who are online.

The group of content servers 102b includes content server systems. The content server systems each provide sports, music, comics, shopping, and various other information.

The group of message servers 102c includes message server systems. The message server systems each provide an environment for real-time message exchanges between users. Specifically, the message server systems provide an environment for a messenger application and a chat application (components of the message exchanging system according to the present embodiment; described later) activated by a user on his or her client machine. It essentially executes routing (setting destinations and paths) for distributing exchange messages from the messenger application and chat messages from the chat application.

The group of mail servers 102d includes mail server system. The mail server systems each provide an environment for electronic-mail exchanges between users.

The group of game A servers 102e and the group of game B servers 102f include game server systems. The game server systems each provide an environment for an online game. A user activates an online game in the game server system from the viewer to play the game. If that online game is a role playing game (the user acts as a character in the game), the user can play this role playing game with other member users.

The group of profile servers 102g includes profile server systems. The profile server systems each manage the profile (introduction) of a user corresponding to each account. A user can register his or her profile in the profile server system from the viewer.

(Client System)

In the present embodiment, a description will be given of a case where the client system is a home video game machine in the above system configuration.

Figure 2:
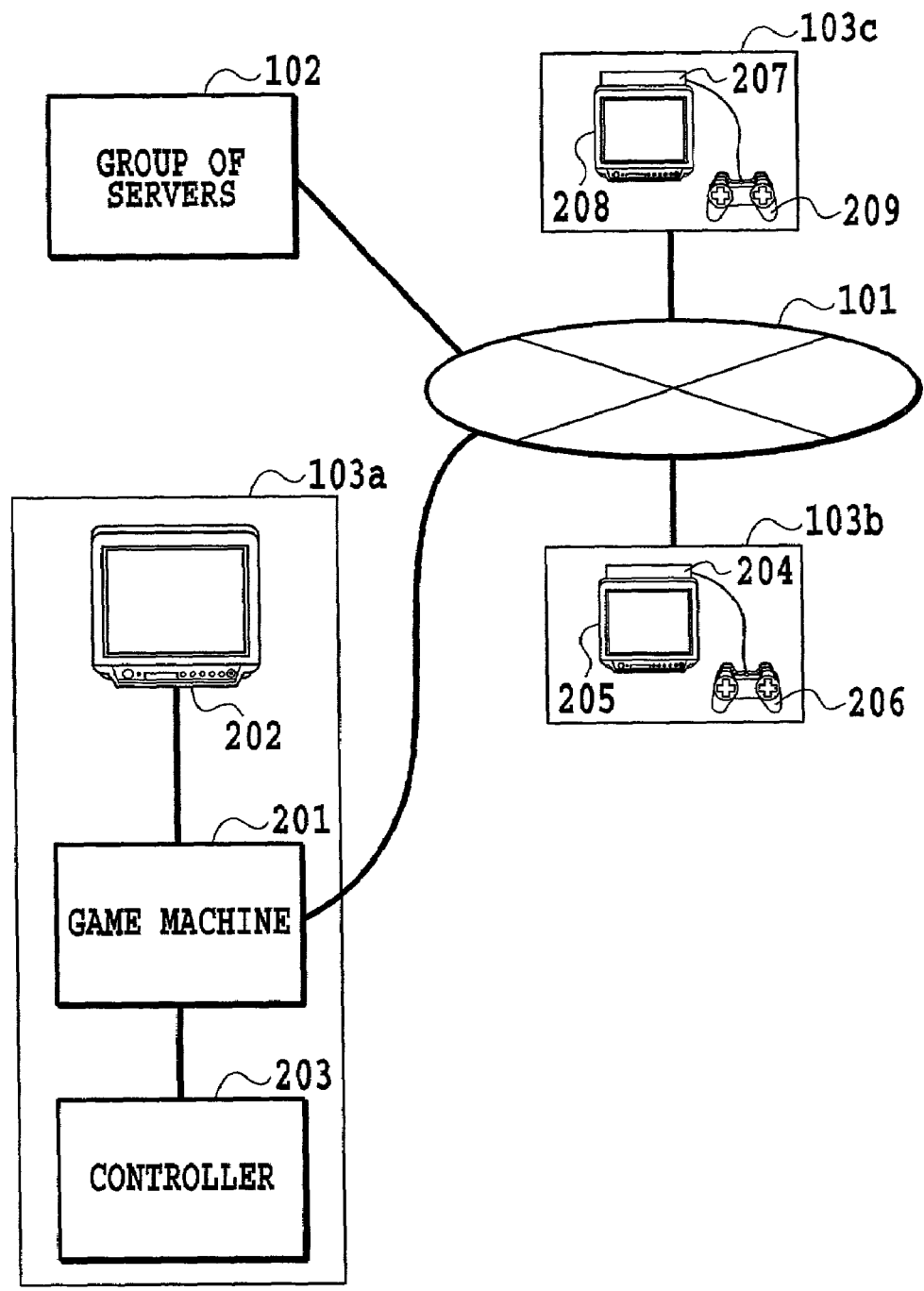
FIG. 2 is a view useful in explaining an environment used for a home video game machine according to an embodiment of the present invention.

FIG. 2 is a view showing an example of an environment used for the client systems 103a, 103b, and 103c that are home vide game machines. These client systems are connected to the group of servers 102 via the communications network 101.

The client system 103a includes a game machine body 201, a television receiver 202, and a controller 203. Likewise, the client system 103b includes a game machine body 204, a television receiver 205, and a controller 206, and the client system 103c includes a game machine body 207, a television receiver 208, and a controller 209.

The game machine body 201 activates the viewer and accesses the group of servers 102. The television receiver 202 outputs image and sound data from the game machine body 201. The controller 203 inputs the user's instruction to the game machine body 201.

In the present embodiment, users named Maehiro, Junko, and Naoki use the client systems 103a, 103b, and 103c, respectively, to access the group of servers 102.

Figure 3:
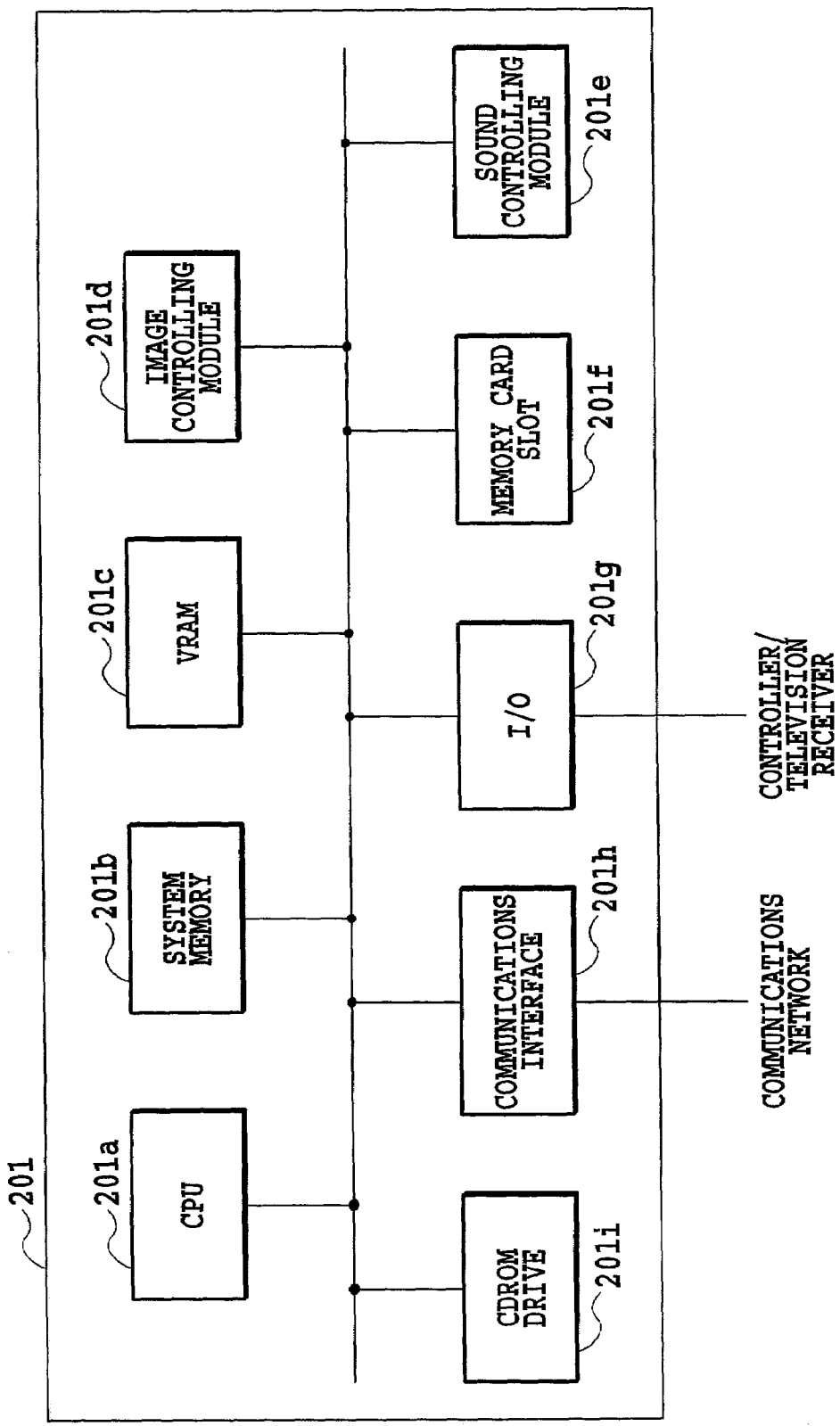
FIG. 3 is a block diagram of the system configuration of a game machine body according to an embodiment of the present invention.

FIG. 3 shows the system configuration of the game machine body 201. In this figure, the game machine body 201 includes a CPU (Central Processing Unit) 201a, a system memory 201b, a VRAM (Video RAM) 201c, an image controlling module 201d, a sound controlling module 201e, a memory card slot 201f, an I/O (Input/Output) interface 201g, a communications interface 201h, and a CDROM drive 201i.

The CPU 201a controls the entire game machine body 201 in accordance with a control procedure of a program loaded or stored in the system memory 201b.

The system memory 201b includes a ROM (Read Only Memory), a RAM (Random Access Memory), or the like. The ROM has a BIOS (Basic Input/Output System) program stored therein, and the RAM has control data and a viewer program temporarily stored therein, the viewer program loaded from the CDROM in the CDROM drive 201i.

The VRAM 201c expands image data displayed on the television receiver 202 and temporarily stores them. The image controlling module 201d controls the image data displayed on the television receiver 202. The sound controlling module 201e controls sound data output through the television receiver 202.

The memory card slot 201f is an interface into which a memory card storing data referenced by CPU 201a to activate the viewer is inserted.

The I/O interface 201g inputs and outputs data between an external apparatus such as the television receiver 202 or the controller 203 and the game machine body 201. The communications interface 201h controls communications with the communications network 101.

The CDROM drive 201i drives a CDROM storing a program and reads the program. In the present embodiment, the CDROM storing the viewer program is read from the CDROM drive 201i and loaded in the RAM of the system memory 201b.

Figure 4:
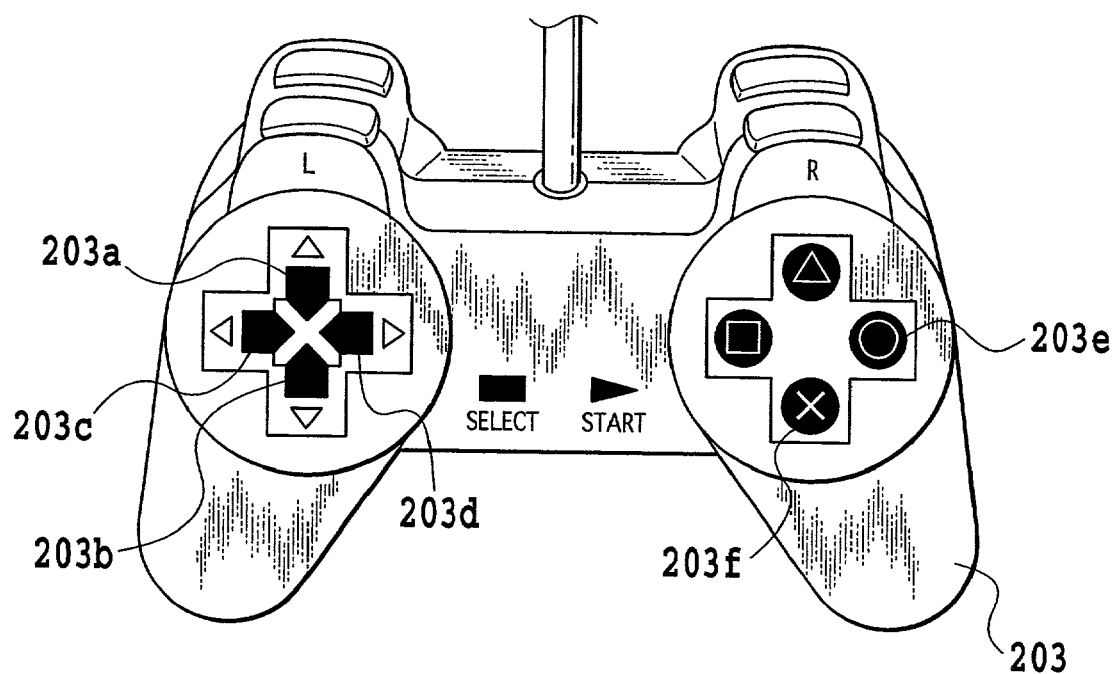
FIG. 4 is a view showing an example of a controller according an embodiment of the present invention.

FIG. 4 shows the controller 203. Reference numerals 203a, 203b, 203c, and 203d denote an up, down, left, and right directional keys, respectively. Reference numeral 203e denotes a circle button, and reference numeral 203f denotes a cross button. The user presses these keys or buttons to give instructions to the game machine body 201.

The directional keys 203a, 203b, 203c, and 203d move, for example, a cursor (a highlight for designating an item) on a screen of the viewer displayed on the television receiver 202, in corresponding directions.

The circle button 203e is used to allow the cursor to perform an operation of deciding a certain item. The cross button 203f is used to cancel the deciding operation or return to the preceding operation step.

(Message Exchange)

A case where the user named Maehiro uses the client system 103a to exchange messages with Junko using the client system 103b and with Naoki using the client system 103c will be described below with reference to FIGS. 5 to 13.

When the user named Maehiro sets the CDROM storing the viewer program, in the game machine body 201, the latter activates the viewer.

The viewer prompts, through its initial screen, the user to input his account and password, so the user inputs his account and password from a software keyboard (a keyboard is displayed on the screen) or an external keyboard (not shown) and uses the circle button 203e to perform the deciding operation to thereby log in the viewer.

The viewer of the present embodiment can use as login accounts four accounts including one master account and three subaccounts. The user named Maehiro is assumed to have logged in using his master account "maehiro".

Figure 5:
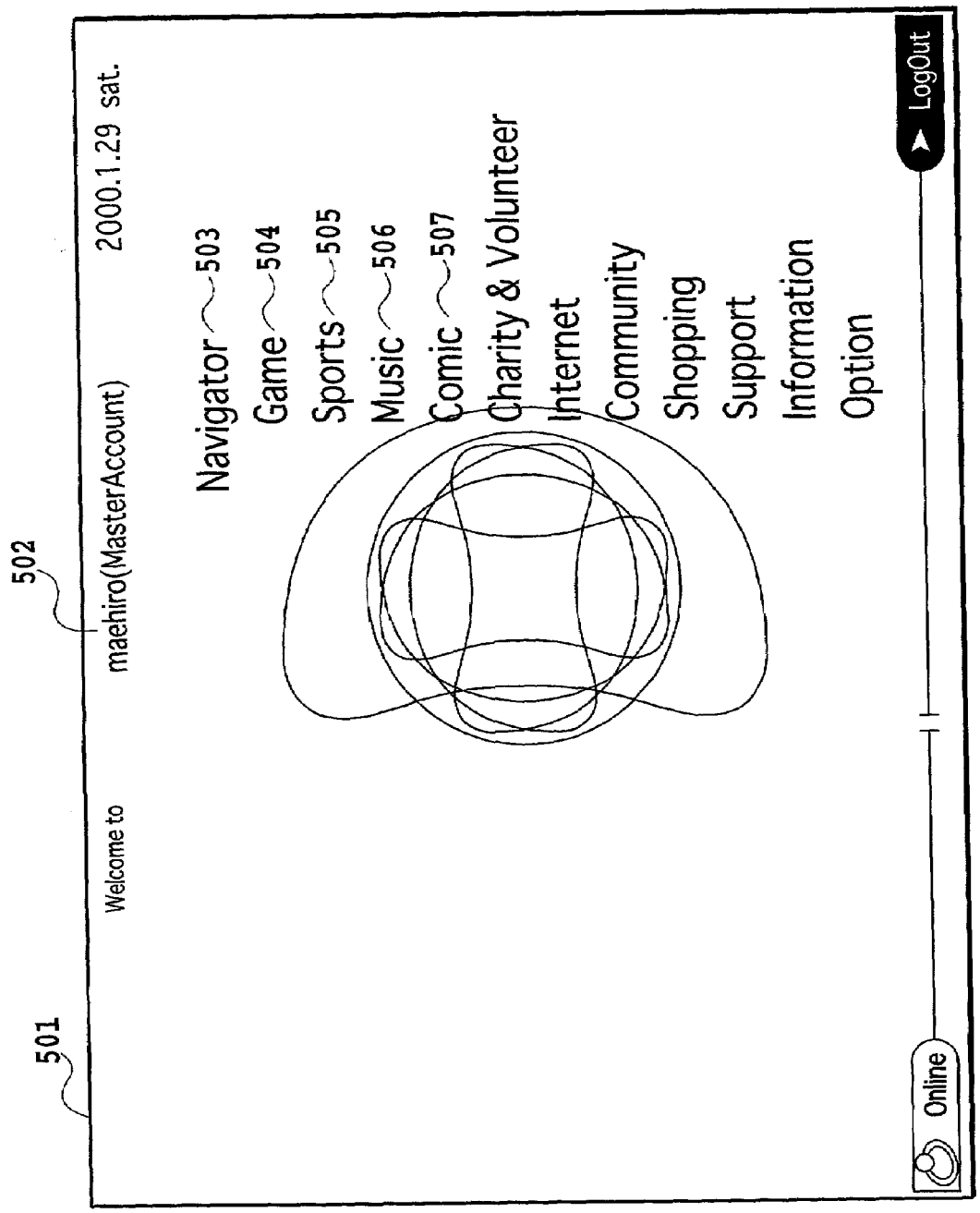
FIG. 5 is a view showing an example of a screen of a viewer displayed immediately after a login operation according to an embodiment of the present invention.

FIG. 5 shows the screen of the viewer displayed immediately after the login operation. In this figure, a viewer menu screen 501 includes an account 502, a navigator command button 503, a game command button 504, a sports command button 505, a music command button 506, a comics command button 507, and the like. At this point of time, the viewer is off line relative to the group of servers 102.

The user moves the cursor to a desired button and performs the deciding operation using the circle button 203e, thereby activating the function associated with the decided button. In this manner, the user can perform the deciding operation on an item with the cursor placed thereon to activate the function associated with that item.

When the user performs the deciding operation on the game command button 504, a game tool is activated which is used to access the group of game A servers 102e and the group of game B servers 102f to play the game.

When the user performs the deciding operation on the sports command button 505, the music command button 506, the comics command button 507, or the like, a content viewing tool is activated which is used to access the group of content servers 102b to obtain various content information.

When the user performs the deciding operation on the navigator command button 503, a communications tool "navigator" is activated which is used to access the group of message servers 102c, the group of mail servers 102d, and the group of profile servers 102g to provide a communications service. The navigator is a communications tool providing integral functions of a messenger application (hereafter simply referred to as a "messenger"), a chat application, a mail application, and others.

A case where the navigator is activated will be described below. When the navigator is activated, the above-mentioned account and password used by the user for the login operation are used to authenticate the access to the group of servers 102, and the viewer gets on line to the group of servers 102.

Figure 6:
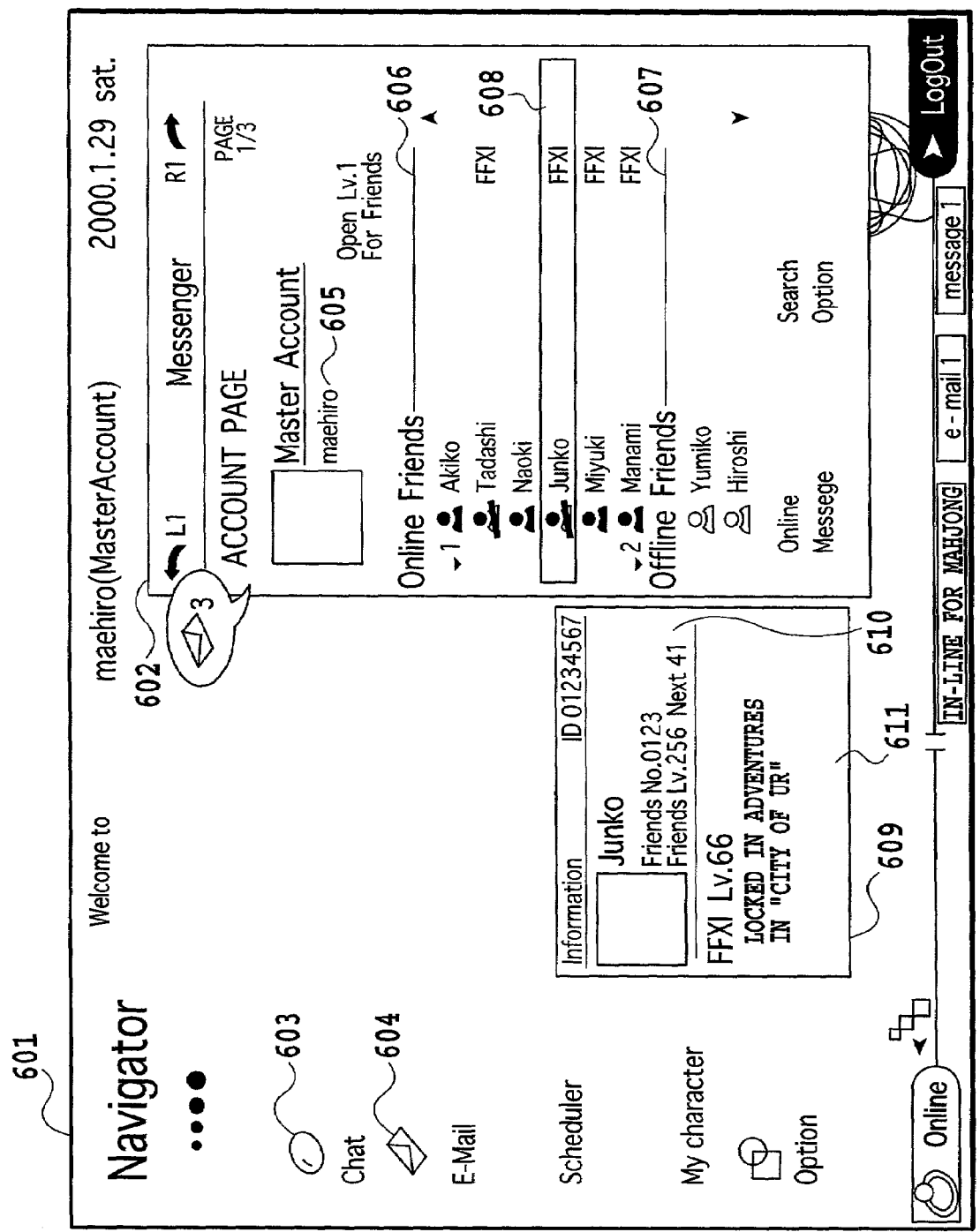
FIG. 6 is a view showing an example of a navigator top screen according to an embodiment of the present invention.

FIG. 6 shows a screen of the viewer displayed if the deciding operation is performed on the navigator command button 503 to activate the navigator. In FIG. 6, a navigator top screen 601 has a messenger main window 602, a chat command button 603, a mail command button 604, and others.

Immediately after the navigator has been activated, the messenger is automatically activated, the viewer gets on line to the group of message servers 102c, and the messenger main window 602 is displayed. The messenger is a communications tool that accesses the group of message servers 102c, that always monitors connections of subscribed users to the group of servers 102, and that enables message exchanges between two users in the online state in real time.

When the user performs the deciding operation on the main command button 604, the mail application is activated which is used to access the group of mail servers 102d to exchange electronic mails.

When the user performs the deciding operation on the chat command button 603, the chat application is activated which is used to access the group of message servers 102c for chats. A viewer screen displayed in this case is shown in FIG. 7.

Figure 7:
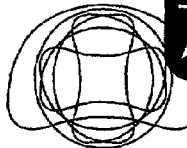
FIG. 7 is a view showing an example of a chat room selecting section according to an embodiment of the present invention.

FIG. 7 is a chat room selecting screen 701. The user performs the deciding operation by, for example, moving the cursor to a chat room 703 to be selected. To open a new chat room, the user performs the deciding operation on a chat room opening button 702 and executes a procedure of newly establishing a predetermined chat room in the message server system of message servers 102c.

FIG. 8 is a viewer screen displayed when the user selects or newly opens a chat room on the chat room selecting screen 701 in FIG. 7. In FIG. 8, a chat screen 801 has a chat window 802, a message input window 803, a list of members 804, and others.

The message server system manages chat room data including the list of members of the opened chat room, and chat messages transmitted to the chat room and saved in accordance with time series. The message server system transmits the chat room data on the opened chat room to the users of the accounts shown in the list of members, using a multicast function.

The client system displays the chat messages from the received chat room data on the chat window 802, while displaying the list of members from the received chat room data in the list of members 804.

Referring back to FIG. 6, the user named Maehiro can select another user from the messenger main window 602 to exchange messages with in real time on a one-to-one basis.

At this time, while exchanging messages with another user in real time using the messenger, the user named Maehiro may receive a message from a third person. In this case, without the above described procedure of performing the deciding operation on the chat command button 603, opening a new chat room on the chat room selecting screen 701 in FIG. 7, and displaying the chat screen 801 in FIG. 8, the messenger can automatically open a new chat room so as to simply switch to chats between three or more users. This is characteristic of the message exchanging system of the present embodiment.

The messenger will be explained below in detail. In FIG. 6, the messenger main window 602 displays a friend list.

The friend list displays the accounts of friends, that is, subscribed users with whom the user named Maehiro has been acquainted, for example, through an online game, in connection with the account "maehiro" based on previously registered account friend list data.

The friend list on the messenger main window 602 includes an account 605, online friends 606, offline friends 607, and others.

The online friends section 606 shows the accounts of users in the friend list who are now on line to the group of servers 102. The offline friends 607 indicate the accounts of users in the friend list who are now off line to the group of servers 102. The online friends section 606 further shows the status of online users, for example, the names of online games they are playing.

If the account of Junko using the client system 103b is "Junko", the account of Naoki using the client system 103c is "Naoki", and both accounts are registered in the friend list data for the account "maehiro", then the accounts "Naoki" and "Junko" are displayed in the online friends section 606.

The account "Junko" 608 in the online friends section 606, which is indicated by the cursor, is also shown to be playing the online game FFX1.

By moving the cursor within the friend list on the messenger main window 602, the user can view in an information window, user information for the account indicated by the cursor. For example, information on Junko of the account "Junko" 608, which is indicated by the cursor, is displayed in the information window 609.

The information window 609 displays a simplified profile 610 of Junko of the account "Junko" and a user status 611 (for example, the name of the online game the user is playing).

The information on whether the user of each account in the friend list is online or offline, the status of online users, and the like is obtained by the messenger by accessing the group of messenger servers 102c and always monitoring them.

Figure 9:
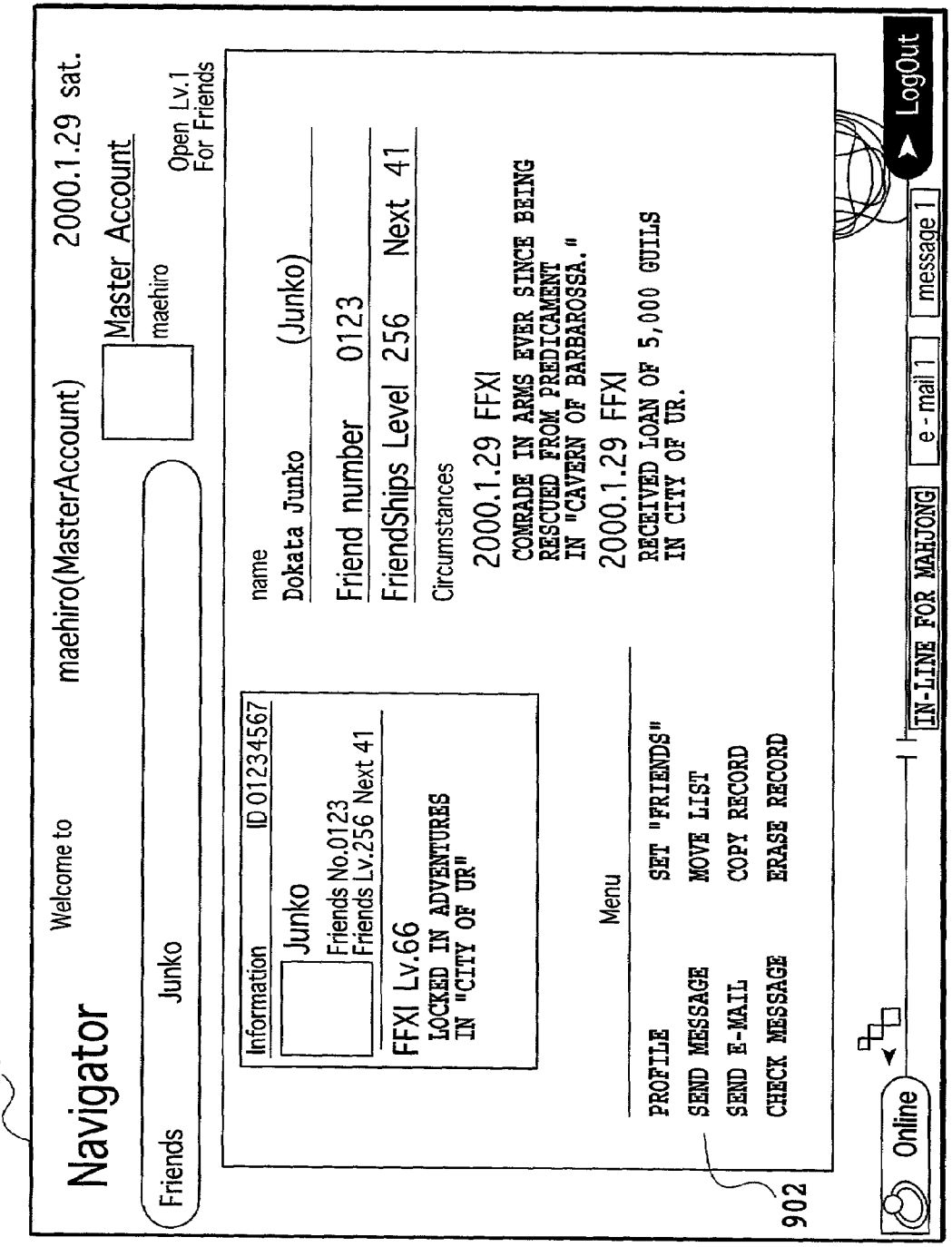
FIG. 9 is a view showing an example of a friend screen according to an embodiment of the present invention.

In FIG. 6, when the user performs the deciding operation on the account "Junko" 608, which is indicated by the cursor, the viewer displays a screen for issuing various subcommands to Junko of the account "Junko". FIG. 9 shows a viewer screen displayed in this case.

FIG. 9 shows a friend screen 901 for issuing various subcommands to Junko of the account "Junko".

Figure 10:
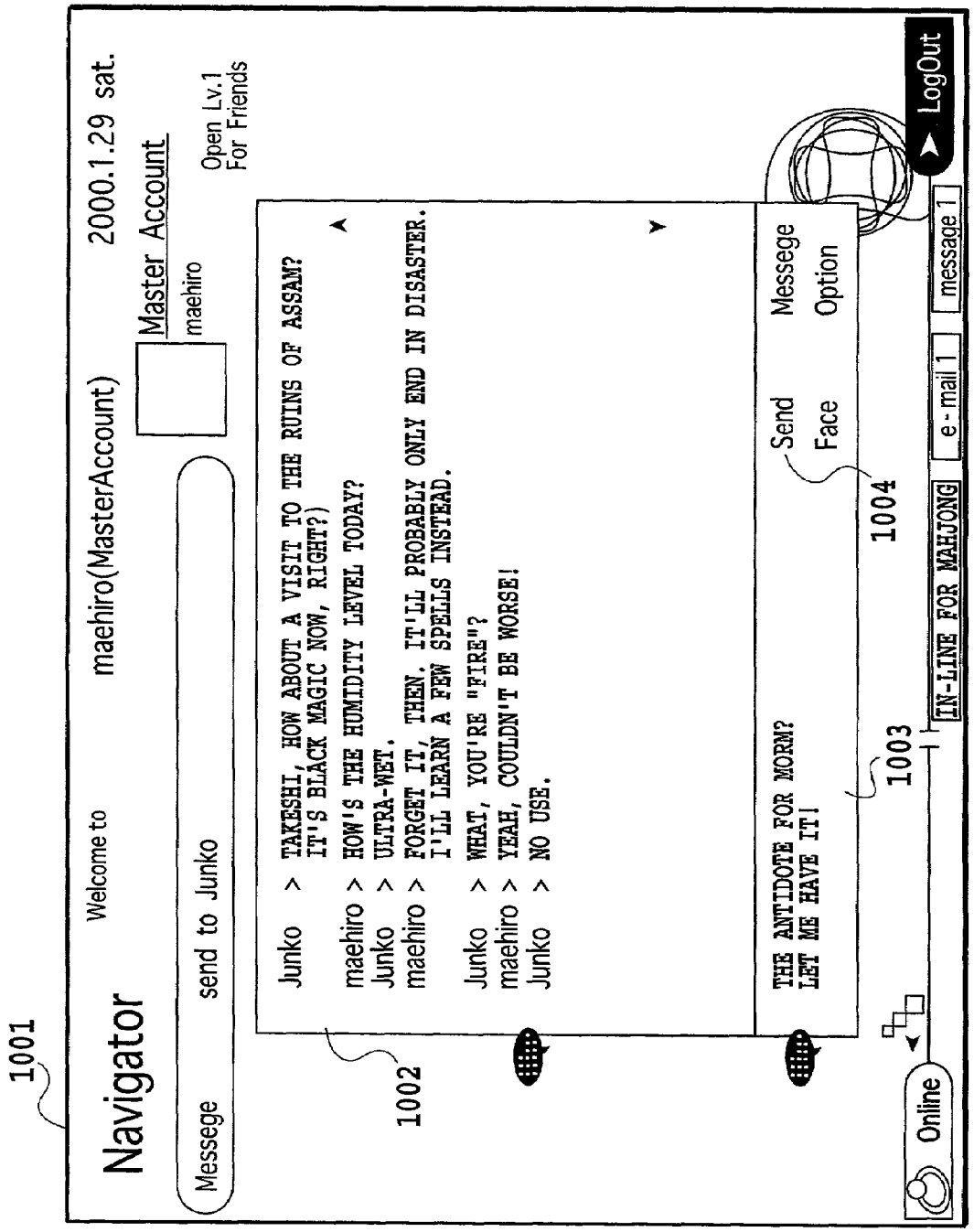
FIG. 10 is a view showing an example of a message screen according to an embodiment of the present invention.

When the user performs the deciding operation on a message transmission command button 902, one of the subcommands, the messenger enters a messenger mode in which it exchanges messages with Junko of the account "Junko" in real time. FIG. 10 shows a viewer screen displayed in the messenger mode of the messenger.

In FIG. 10, a message screen 1001 has a message log 1002, a message input window 1003, a transmission command button 1004, and others. The message screen 1001 shows a case where Maehiro of the account "maehiro" exchanges messages with Junko of the account "Junko".

The user named Maehiro inputs a transmitted message to the message input window 1003 from the software keyboard or the external keyboard (neither of them shown). Then, when the user performs the deciding operation on the transmission command button 1004 and transmits the input transmitted message to Junko, the transmitted message is additionally displayed in the message log 1002 next to the latest message following "Junko>".

In addition, when the user named Maehiro receives a message from Junko, the received message is additionally displayed in the message log 1002 next to the latest message following "maehiro>".

In this case, a message server system of the group of servers 102c which receives the transmitted message from Maehiro only distributes this message to Junko of the account "Junko" using the unicast function. Conversely, a message server system receiving the above received message only distributes this message to Maehiro of the account "maehiro" using the unicast function.

On the other hand, the messenger of Maehiro's client system 103a displays as the message log 1002 a log (communication record) of the transmitted and received messages exchanged with Junko of the account "Junko" as if a chat was going on between the two users.

Figure 11:
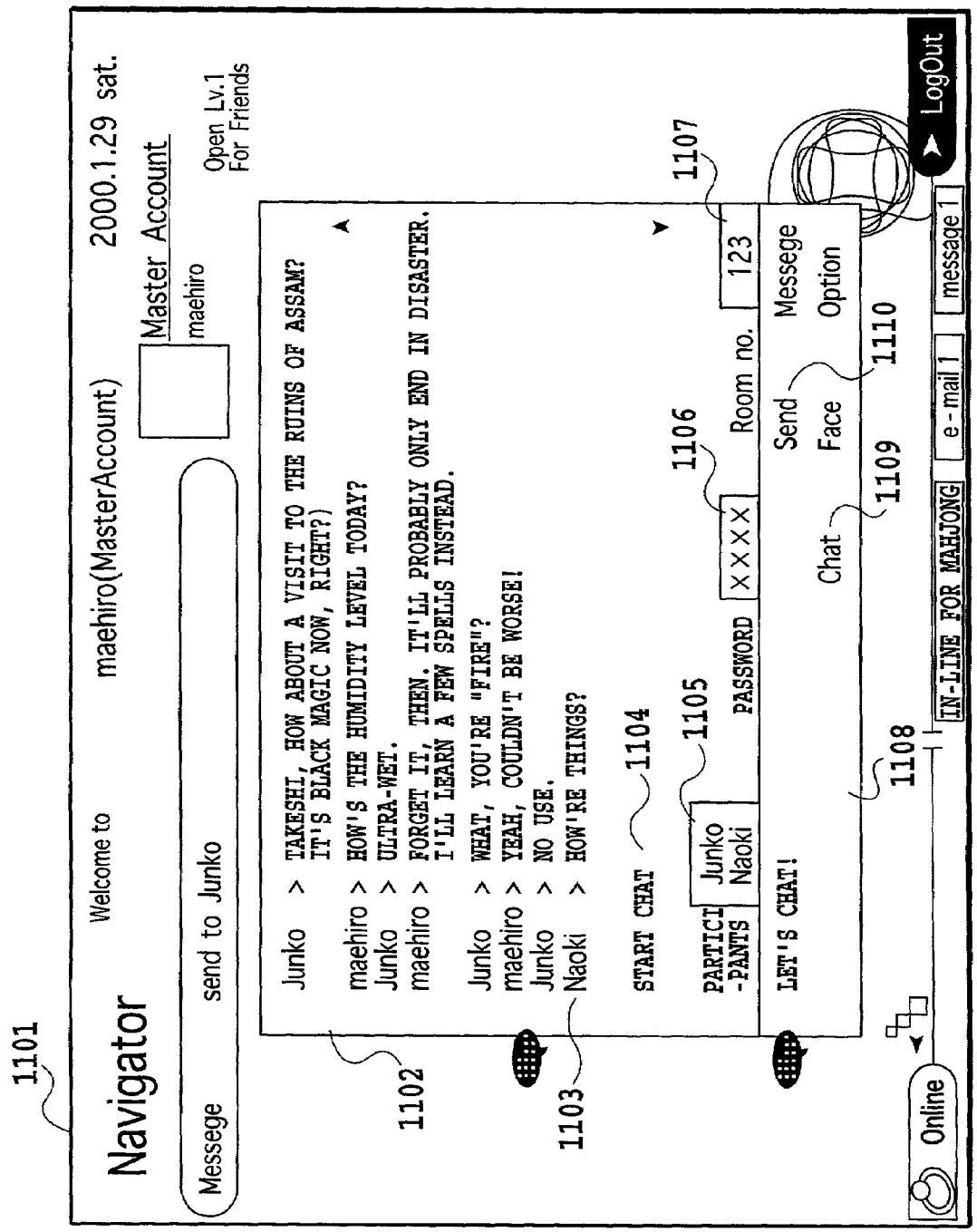
FIG. 11 is a view showing an example of a message screen according to an embodiment of the present invention.

Here, it is assumed that the user named Maehiro receives a message from a third person of the account Naoki while exchanging messages with Junko of the account "Junko" in the message mode of the messenger. FIG. 11 shows a viewer screen displayed in this case.

In FIG. 11, a message log 1102 of a message screen 1101 additionally displays a received message 1103, the latest message, after "Naoki>".

At this time, the messenger detects that the message exchanges with Junko of the account "Junko" have been interrupted by the received message from the account "Naoki", and thus displays a chat open item 1104 for prompting the user named Maehiro to open a new chat room, a chat member designating window 1105, and a chat room password input window 1106. The chat member designating window 1105 already displays the accounts "Junko" and "Naoki", which are the sources of the messages received by the user.

Since the friend list on the messenger main window 602 contains the accounts "Junko" and "Naoki", the user determines that himself, the accounts "Junko" and "Naoki" have been acquainted with one another through the online game. Upon determining that a chat room be opened for chats between the three users, the user performs the deciding operation on the accounts "Junko" and "Naoki" displayed in the chat member designating window 1105.

Then, the user inputs a password for a chat room to be opened, to the chat room password input window 1106 and then performs the deciding operation. Subsequently, the messenger transmits this password to the group of message servers 102c to enter a chat room opening mode.

A message server system of the group of message servers 102c which has received the password opens a new chat room and returns a chat room number automatically applied to this chat room, for example, the chat room number "123" to the messenger.

Subsequently, the messenger displays a chat room number display window 1107 and a chat command button 1109. The chat room number display window 1107 displays the chat room number "123" of the newly opened chat room.

The user named Maehiro inputs a transmitted message to a message input window 1008 from the software keyboard or the external keyboard (neither of them shown). Then, when the user performs the deciding operation on the transmission command button 1110 and transmits the input transmitted message.

At this time, the messenger, which is in the chat room opening mode, transmits the transmitted message to the accounts "Junko" and "Naoki" decided through the chat member designating window 1105. Additionally, this transmitted message acts as a chat start message having the password input to the chat room password input window 1106, the chat room number "123" displayed in the chat room number display window 1107, and an attribute that is indicative of the chat room opening mode.

Figure 12:
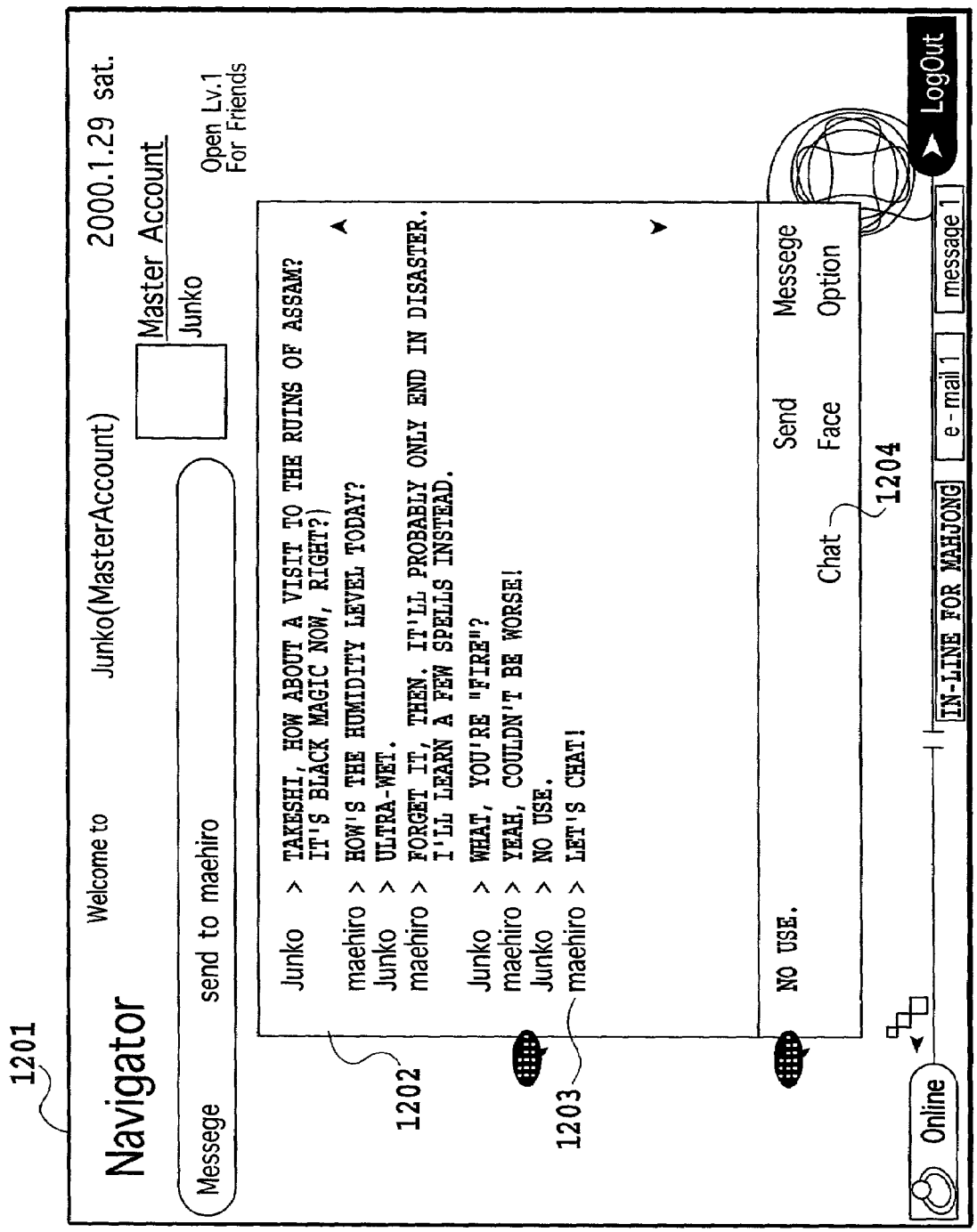
FIG. 12 is a view showing an example of a message screen according to an embodiment of the present invention.
Figure 13:
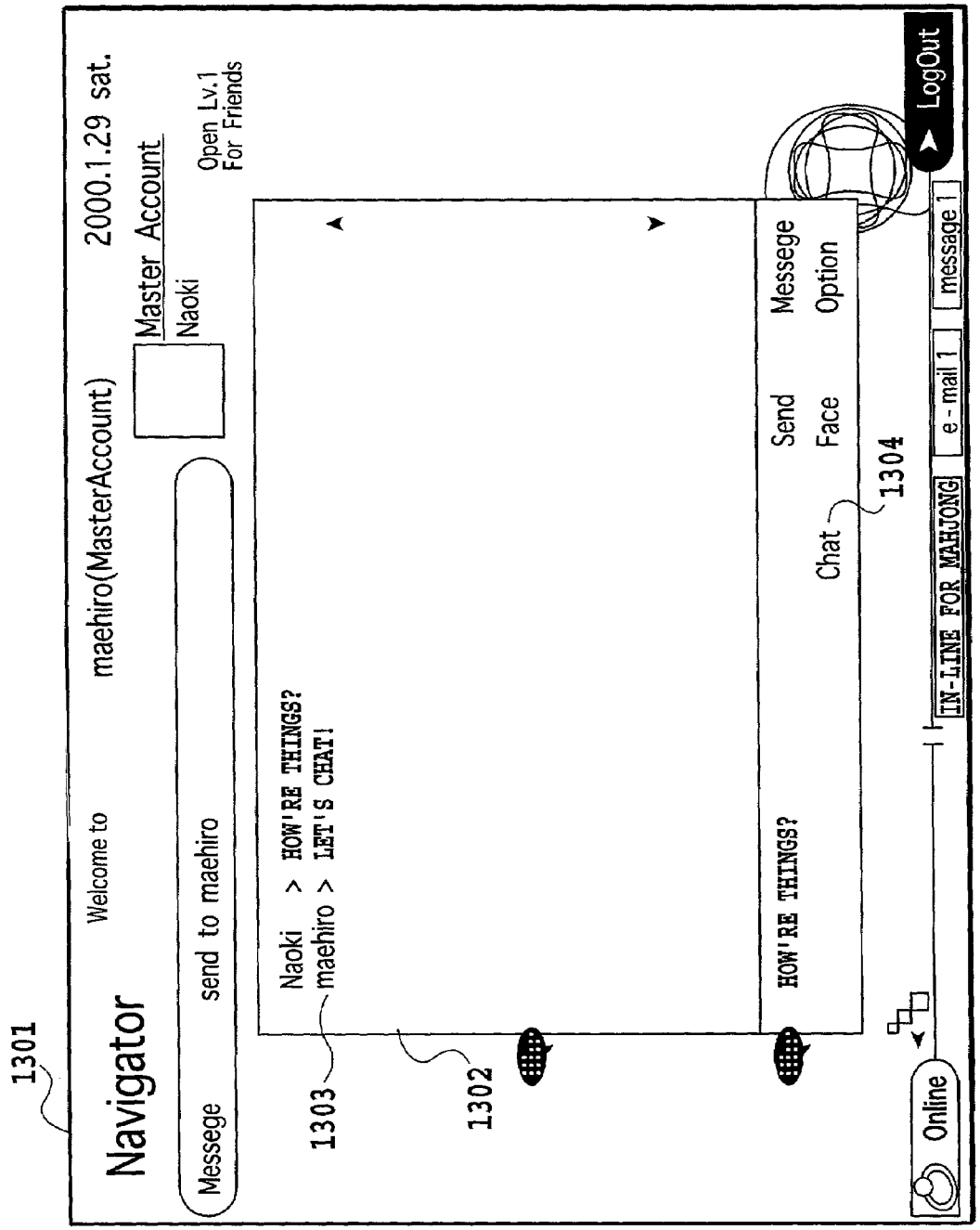
FIG. 13 is a view showing an example of a message screen according to an embodiment of the present invention.

FIGS. 12 and 13 show viewer screens for the accounts "Junko" and "Naoki", which have received the chat start message.

In FIG. 12, a message log 1202 of a message screen 1201 additionally displays a received message 1203, the latest message, after "maehiro>".

At this time, a messenger for the account "Junko" detects that the received message 1203 is a chat start message having the attribute that is indicative of the chat room open mode, subsequently stores the accompanying chat room password and chat room number "123", and then displays a chat command button 1204.

In FIG. 13, a message log 1302 of a message screen 1301 additionally displays a received message 1303, the latest message, after "maehiro>".

At this time, a messenger for the account "Naoki" detects that the received message 1303 is a chat start message having the attribute that is indicative of the chat room open mode, subsequently stores the accompanying chat room password and chat room number "123", and then displays a chat command button 1304.

In FIG. 11, when the user named Maehiro performs the deciding operation on the chat command button 1109, the chat application is activated and the viewer displays a chat screen 801 with the chat room number "123". The member list 804 displays a maximum of three accounts including "maehiro", "Junko", and "Naoki".

In FIG. 12, when the user named Junko performs the deciding operation on the chat command button 1204, the chat application is activated and the viewer displays the chat screen 801 with the chat room number "123". The member list 804 displays a maximum of three accounts including "maehiro", "Junko", and "Naoki".

In FIG. 13, when the user named Naoki performs the deciding operation on the chat command button 1304, the chat application is activated and the viewer displays the chat screen 801 with the chat room number "123". The member list 804 displays a maximum of three accounts including "maehiro", "Junko", and "Naoki".

In the above embodiment, when the user named Maehiro receives a message from a third person while exchanging messages with another user in real time using the messenger, the messenger automatically opens a new chat room and allows the user named Maehiro to shift to the simply installed chat room.

(Client System Process)

A process procedure executed by the client system 103*a* to allow the user named Maehiro to exchange messages with Junko and Naoki as described above with reference to FIGS. 5 to 13 will be described below with reference to data in the memory card in FIG. 14 and the flow chart in FIG. 15.

Figure 15:
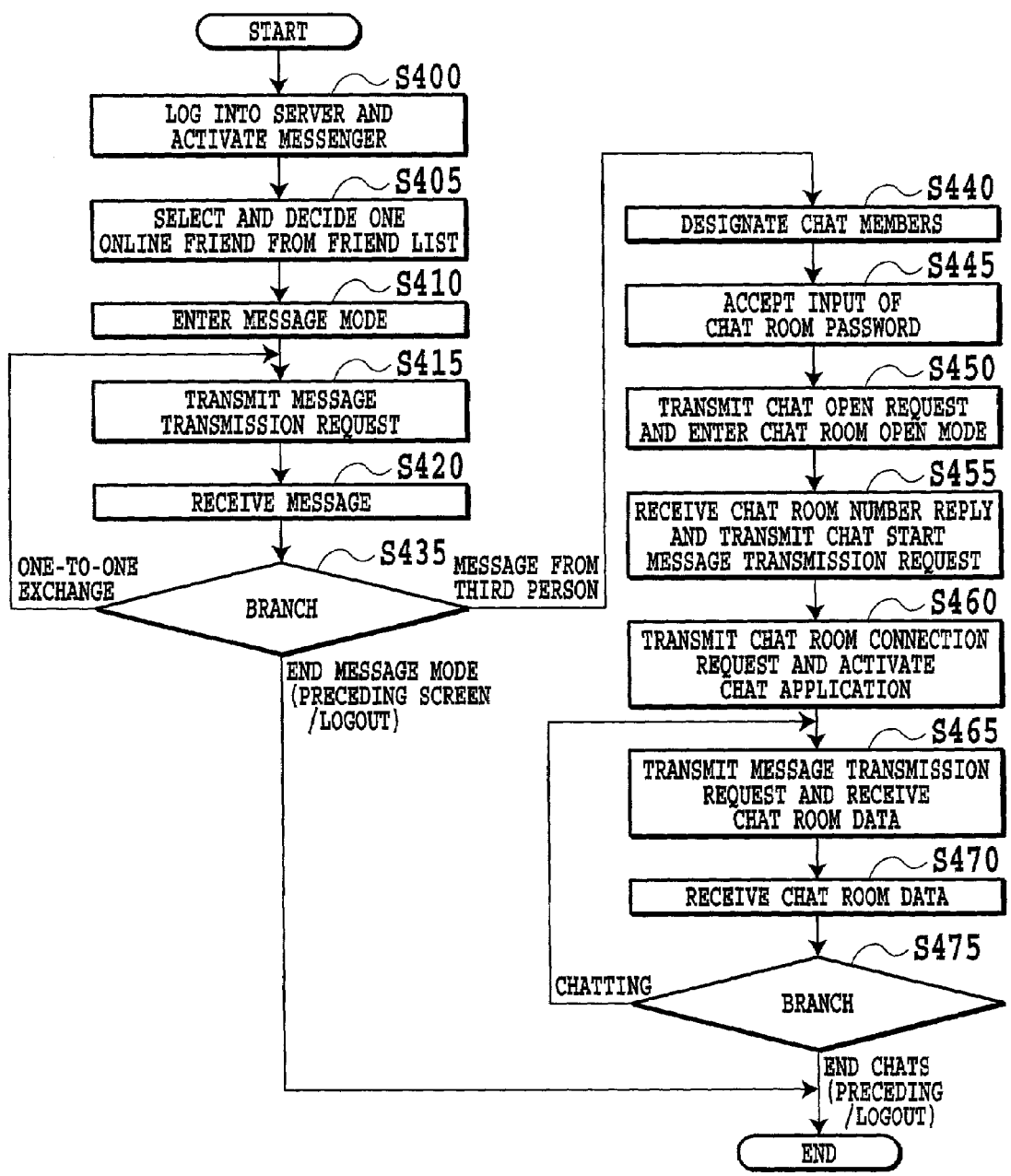
FIG. 15 is a flow chart showing a process procedure of a viewer program according to an embodiment of the present invention.

The process procedure shown in FIG. 15 is achieved by the CPU 201*a* of the game machine body 201 of the client system 103*a* by executing the viewer program loaded in the RAM of the system memory 201*b* from the CDROM. At the same time, the CPU 201*a* references the data stored in the memory card inserted into the memory card slot 201*f*.

Figure 14:
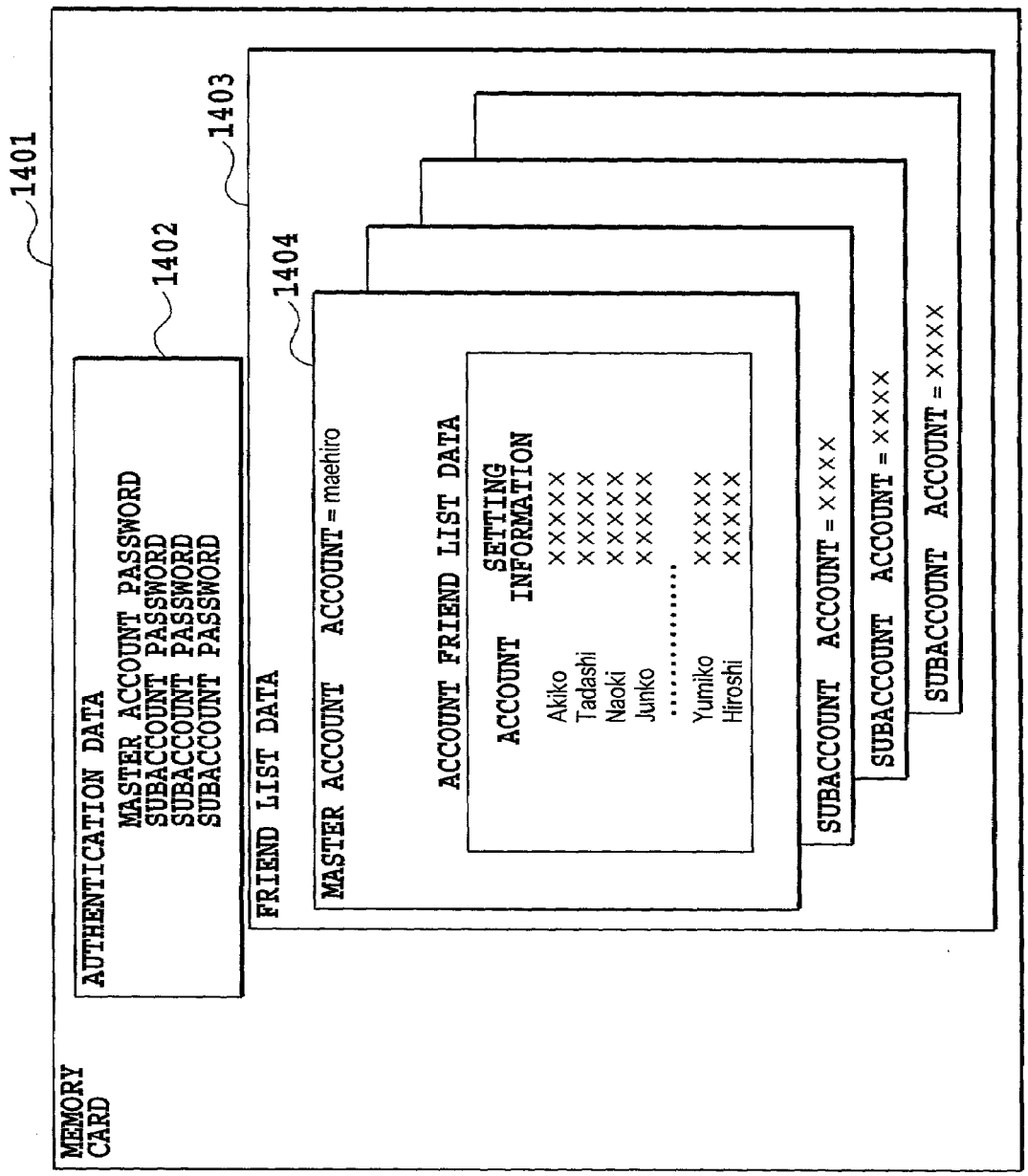
FIG. 14 is a view showing an example of a memory card according to an embodiment of the present invention.

In FIG. 14, a memory card 1401 stores authentication data 1402 and friend list data 1403.

The authentication data 1402 includes a master account used to log into the viewer and access the group of servers 102, three subaccounts, and passwords each paired with the corresponding accounts.

The friend list data 1403 includes account friend list data associated with each of the accounts. For example, account friend list data 1404 for the account "maehiro" have the accounts of subscribed users with whom this user has been acquainted through online games, set and registered therein as friends.

The account friend list data 1404 have set information (for example, simplified profile 610) for the friend of each account.

The account friend list data may preferably be set by means of a friend list setting function of online games provided by the group of game A servers 102*e* and the group of game B servers 102*f*.

In FIG. 15, the CPU 201*a* checks the account "maehiro" and password input by the user through the initial viewer screen against a set of an account and a password in the authentication data 1402 stored in the memory card 1401. If they are the same, this account is permitted to log into the viewer and the television receiver 202 displays the view menu screen 501.

Furthermore, upon detecting the deciding operation on the navigator command button 503, the CPU 201*a* activates the navigator. The CPU 201*a* then asks the group of servers 102 if they authorize the access of the account and password used to log into the viewer. If the access is authenticated and the CPU 201*a* gets on line to the group of servers 102, the CPU 201*a* displays the messenger main window 602 on the viewer as shown in FIG. 6 and activates the messenger (step S400).

The CPU 210*a* reads an account friend list data 1404 stored in the memory card 1401 and displays a friend list in the messenger main window 602 as shown in FIG. 6. At this time, the CPU 201*a* inquires of the group of message servers 102*c* and obtains and displays the online friends 606 and offline friends 607 information and the status (for example, the names of online games the users are playing) of the users of the online friends 606.

Upon detecting that the account "Junko" 608 in the friend list of the main window 602 is indicated by the cursor, the CPU 201*a* displays the information on Junko in the information window 609. The CPU 201*a* shows in the information window 609, the simplified profile 610 of the account "Junko" obtained from the account friend list data 1404 stored in the memory card 1401, and the status 611 of the users obtained from the group of message servers 102*c*.

Upon detecting the deciding operation on the account "Junko" 608, which is indicated by the cursor, the CPU 201*a* displays the friend screen 901 on the television receiver 202, the screen being used to issue various subcommands such as those shown in FIG. 9 to Junko of the account "Junko" (step S405).

Subsequently, upon detecting the deciding operation on the message transmission command button 902, the CPU 201*a* shifts the messenger to a message mode in which the user exchanges messages with Junko of the account "Junko" in real time, and then displays the message screen 1001 as shown in FIG. 10 (step 410).

The CPU 201a buffers (temporarily stores) the transmitted message input to the message input window 1003, in the RAM of the system memory 201b. Then, upon detecting the deciding operation on the transmission command button 1004, the CPU transmits a message send request with the buffered transmitted message and the account "Junko" added thereto as destination information, to a message server system of the group of message servers 102c (step S415). At this time, the CPU 201a additionally displays the transmitted message in the message log 1002 next to the latest message following "Junko>".

In addition, upon receiving the received message with the account "Junko" added thereto, from the message server system, the CPU 201a additionally displays the received message in the message log 1002 next to the latest transmitted message following "Junko>" (step S420).

Upon detecting the deciding operation on the transmission command button 1004, the CPU 201a repeats the steps S415 and S420 (step S435). The CPU 201a displays as the message log 1002 a log of the transmitted and received messages exchanged with Junko of the account "Junko" as if a chat was going on between the two users (loop of step S415→step S420→step S435→step S415).

Then, upon detecting a received message from the third person of the account Naoki while exchanging messages with Junko of the account "Junko" in the message mode, the CPU 201a displays the message screen 1101 as shown in FIG. 11 (step S435→step S440). At this time, the CPU 201a additionally displays the received message 1103, the latest message, after "Naoki>" as the message log 1002.

The CPU 201a detects that the message exchanges with Junko of the account "Junko" have been interrupted by the received message from the account "Naoki", and thus displays the chat open item 1104 for prompting the user to open a new chat room, the chat member designating window 1105, and the chat room password input window 1106. The chat member designating window 1105 already displays the accounts "Junko" and "Naoki", which are the sources of the messages received by the user.

Upon detecting the deciding operations on the accounts "Junko" and "Naoki" displayed in the chat member designating window 1105, the CPU 201a stores the accounts "Junko" and "Naoki" in the RAM of the system memory 201b as chat members (step S440).

Then, upon detecting that the chat room password has been input to the chat room password input window 1106 and the deciding operation has then been performed, the CPU 201a stores this chat room password in the RAM of the system memory 201b (step S445).

The CPU 201a transmits a chat open request with the chat room password added thereto, to the group of the message servers 102c to shift the messenger to the chat room open mode (step S450).

A message server system of the group of message servers 102c which has received the chat open request with the password added thereto opens a new chat room and returns a chat room number reply with a chat room number, for example, the chat room number "123", added thereto and automatically applied to this chat room.

Upon receiving the chat room number reply, the CPU 201a displays the chat room number display window 1107 and the chat command button 1109. The CPU 201a also stores the chat room number added to the chat room number reply in the RAM and displays it in the chat room number display window 1107.

Upon detecting that a transmitted message has been input to the message input window 1008 and the deciding operation on the transmission command button 1110 has then been performed, the CPU 201a transmits a chat start message transmission request with the transmitted message (chat start message) added thereto, to the message server system (step S455).

At this time, the CPU 201a adds the accounts "Junko" and "Naoki" stored in the RAM as chat members, to the chat start message transmission request as destination information. The CPU 201a further adds to the chat start message transmission request, the chat room password stored in the RAM, the chat room number "123", and an attribute indicating that the messenger is in the chat room open mode.

Upon detecting the deciding operation on the chat command button 1109 shown in FIG. 11, the CPU 201a transmits a chat room connection request to the message server system (step S460). At this time, the CPU 201a adds the chat room connection request with the chat room password and chat room number "123" stored in the RAM, to the chat room connection request and transmits them to connect to the chat room. The CPU 201a then activates the chat application, receives chat room data from the message server system, and displays a chat message from the chat room data in the chat screen 801 for the chat room number "123" as shown in FIG. 8.

If the users of the accounts "Junko" and "Naoki", who have received the chat start message transmission request, have already connected to the chat room by transmitting the chat room password and chat room number "123" obtained by using the chat start message transmission request, then the CPU 201a receives a list of members from the message server system and displays the accounts "maehiro", "Junko", and "Naoki" in the member list 804.

The CPU 201a buffers the transmitted message input to the message input window 803, in the RAM as the system memory 201b. Upon detecting the deciding operation on the transmission command button 805, the CPU 201a transmits the message transmission request with the buffered transmitted message and the chat room number "123" added thereto, to the message server system of the group of message servers 102c.

Immediately after this transmission, the CPU 201a receives chat room data from the message server system and renews the chat window 802 with a chat message from the chat room data, while renewing the number list 804 with a member list from the chat room data (step S465).

Additionally, while waiting for chat reception, upon receiving chat room data from the message server system, the CPU 201a renews the chat window 802 with a chat message from the chat room data, while renewing the number list 804 with a member list from the chat room data (step S470).

Upon detecting the deciding operation on the transmission command button 805, the CPU 201a repeats the steps S465 and S470 (loop of step S465→step S470→step S475→step S465).

Upon detecting a deciding operation of causing the messenger to return to the preceding screen during the message mode, or a deciding operation for a logout operation, the CPU 201a ends the message exchanges executed by the two users using the messenger (step S435→end). Likewise, upon detecting, during a chat using the chat application, a deciding operation of returning to the preceding operation of a deciding operation for a logout operation, the CPU 201*a* ends the chat application (step S475→end).

OTHER EMBODIMENTS

In addition to the above embodiment, the following forms can be implemented:

1) In the above embodiment, the client system comprises a home video game machine, but it may be a PC.

In this case, the viewer may be stored in a hard disk instead of being loaded from the CDROM. Additionally, the authentication data and the friend list data may be saved to a hard disk instead of the memory card 1401. Further, the controller may be replaced with a mouse or a keyboard.

2) In the above embodiment, the client system is a home video game machine, but it may be a terminal, a game machine, or the like which is installed in a game center.

In this case, the viewer may be stored in a built-in storage device beforehand instead of being loaded from the CDROM. Additionally, the authentication data and the friend list data may be saved to a hard disk instead of the memory card 1401. Further, the controller may be an arbitrary well-known device.

3) In the above embodiment, the client system is a home video game machine, but it may be a portable information terminal such as a cellular telephone or a PDA (Personal Digital Assistant).

In this case, the viewer may be stored in a built-in storage device beforehand. Additionally, the authentication data and the friend list data may be saved to a built-in flash memory instead of the memory card 1401. Further, the input device corresponding to the controller may be input keys or the like.

4) In the above embodiment, when a user receives a message from a third person while the user is exchanging messages with another user in real time, the messenger automatically opens a new chat room and allows the user to simply shift to the new chat room for chats between the three users. The present invention, however, is not limited to the shifting to chats between three users but is of course applicable to shifting to chats between four or more users if a additional people generate interrupting messages while two users are exchanging messages.

The present invention has been described in detail with respect to preferred embodiments. It will now be more apparent from the foregoing to those skilled in the art that changes and modifications may be made without departing from the invention. Therefore, the appended claims cover all changes and modifications that fall within the true spirit of the invention.

What is claimed is:

1. A client system in a message exchanging system, the message exchanging system comprising a plurality of client systems and at least one server system connected together via a communications network, the server system authenticating each user of said plurality of client systems and accumulating and distributing messages, said plurality of client systems exchanging messages via said server system, the client system comprising:

a first message exchanging application that is limited to one-to-one message exchanges with a first client system of said plurality of client systems via a first interface;

a second message exchanging application that enables simultaneous message exchanges with at least one additional second client systems of said plurality of client systems via a second interface; and a message exchange switching system that switches between the first interface of said first message exchanging application and the second interface of said second message exchanging application, in response to an action by a user of the client system when said client system receives a message from said second client system while said first message exchanging application is exchanging messages with said first client system, to enable message exchanges with said first and at least one additional second client systems.

2. The client system according to claim 1, wherein said message exchange switching system sets in said server system an environment for allowing said second message exchanging application to exchange messages when said message exchange switching system switches from said first message exchanging application to said second message exchange switching application.

3. The client system according to claim 2, wherein said first message exchanging application displays exchanged transmitted and received messages in one display screen in the order of transmissions and receptions.

4. A message exchanging method for a client system in a message exchanging system comprising a plurality of client systems and at least one server system connected together via a communications network, the server system authenticating each user of said plurality of client systems and accumulating and distributing messages, said plurality of client systems exchanging messages via said server system, the method comprising:

enabling, via a first interface, one-to-one message exchanges with a first client system of said plurality of client systems, the first interface being limited to one-to-one message exchanges;

enabling, via a second interface, simultaneous message exchanges with at least one other second client system of said plurality of client systems; and switching between the first interface of one-to-one message exchanging and the second interface of simultaneous message exchanging, in response to an action by a user of the client system when a message is received from said second client system while exchanging messages with said first client system, to enable message exchanges with said first and second client systems.

5. The message exchanging method for a client system according to claim 4, wherein said switching sets in said server system an environment for allowing exchanging of messages when said switching switches.

6. The message exchanging method for a client system according to claim 5, further comprising displaying exchanged transmitted and received messages in one display screen in the order of transmissions and receptions.

7. A message exchanging method for a message exchanging system comprising a plurality of client systems and at least one server system connected together via a communications network, the server system authenticating each user of said plurality of client systems and accumulating and distributing messages, said plurality of client systems exchanging messages via said server system, the method comprising:

enabling, via a first interface, one-to-one message exchanges with a first client system of said plurality of client systems, the first interface being limited to one-to-one message exchanges;

enabling, via a second interface, simultaneous message exchanges with at least one other second client system of said plurality of client systems; and switching between the first interface of one-to-one message exchanging and the second interface of simultaneous message exchanging, in response to a user action when a message is received from said second client system while exchanging messages with said first client system, to enable message exchanges with said first and second client systems.

8. The message exchanging method according to claim 7, wherein said switching sets in said server system an environment for allowing exchanging messages when said switching switches.

9. The message exchanging method according to claim 8, further comprising displaying exchanged transmitted and received messages in one display screen in the order of transmissions and receptions.

10. A computer-readable recording medium for a client system in a message exchanging system, the recording medium having a message exchanging program recorded therein as to be executable, the message exchanging system comprising a plurality of client systems and at least one server system connected together via a communications network, the server system authenticating each user of said plurality of client systems and accumulating and distributing messages, said plurality of client systems exchanging messages via said server system, the program comprising;

a first message exchange having a first interface containing an instruction that enables one-to-one message exchanges with a first client system of said plurality of client systems, the first interface being limited to one-to-one message exchanges;

a second message exchange having a second interface containing an instruction that enables simultaneous message exchanges with at least one other second client system of said plurality of client systems;

and a message exchange switching instruction that switches between the first interface of said first message exchange and the second interface of said second message exchange, in response to an action by a user of the client system when a message is received from said second client system while said first message exchange is exchanging messages with said first client system, to enable message exchanges with said first and second client systems.

11. The recording medium of claim 10, wherein said message exchange switching instruction sets in said server system an environment for allowing said second message exchange to exchange messages when said message exchange switching switches from said first message exchange to said second message exchange.

12. The recording medium according to claim 11, wherein said first message exchange displays exchanged transmitted and received messages in one display screen in the order of transmissions and receptions.

13. A program product of a message exchanging method for a client system in a message exchanging system comprising a plurality of client systems and at least one server system connected together via a communications network, the server system authenticating each user of said plurality of client systems and accumulating and distributing messages, said plurality of client systems exchanging messages via said server system, the program product comprising:

a first message exchange having a first interface that enables one-to-one message exchanges with a first client system of said plurality of client systems, the first interface being limited to one-to-one message exchange;

a second message exchange having a second interface that enables simultaneous message exchanges with at least one other second client system of said plurality of client systems; and a message exchange switching that switches between the first interface of said first message exchange and the second interface of said second message exchange, in response to an action by a user of the client system when a message is received from said second client system while said first message exchange is exchanging messages with said first client system, to enable message exchanges with said first and second client systems.

14. The program product according to claim 13, wherein said message exchange switching sets in said server system an environment for allowing said second message exchange to exchange messages if said message exchange switching switches from said first message exchange to said second message exchange.

15. The program product according to claim 14, wherein said first message exchanges displays exchanged transmitted and received messages in one display screen in the order of transmissions and receptions.

16. The system of claim 1, further comprising a button displaying system that displays a button in response to interruption of the one-to-one message exchanging by the second client system, selecting the button by the user enabling the switching system.

17. The method of claim 4, further comprising displaying a button in response to interruption of the one-to-one message exchanging by the second client system, selecting the button by the user enabling the switching.

18. The method of claim 7, further comprising displaying a button in response to interruption of the one-to-one message exchanging by the second client system, selecting the button by the user enabling the switching.

19. The medium of claim 10, further comprising a button display that displays a button in response to interruption of the one-to-one message exchanging by the second client system, selecting the button by the user enabling the message exchange switching.

20. The program product of claim 13, further comprising a button display that displays a button in response to interruption of the one-to-one message exchanging by the second client system, selecting the button by the user enabling the message exchange switching.

* * * * *